United States Patent [19]

Proni

[11] Patent Number: 4,544,186
[45] Date of Patent: Oct. 1, 1985

[54] UNITARY CLAMP ACTION FITTING

[75] Inventor: Oscar Proni, Hollywood, Fla.

[73] Assignee: Proni Industries, Inc., Miami, Fla.

[21] Appl. No.: 451,928

[22] Filed: Dec. 21, 1982

Related U.S. Application Data

[63] Continuation-in-part of Ser. No. 339,695, Jan. 15, 1982.

Foreign Application Priority Data

Dec. 10, 1983 [CA] Canada ........... PCT/US82/01723

[51] Int. Cl.4 ............................................. F16L 21/06
[52] U.S. Cl. .................................. 285/243; 285/245; 285/257; 285/322
[58] Field of Search ............... 285/322, 243, 257, 245; 403/290, 371; 411/433, 443, 280, 237

[56] References Cited

U.S. PATENT DOCUMENTS

| | | | |
|---|---|---|---|
| 923,041 | 5/1909 | Garretson . | |
| 1,230,561 | 6/1917 | Chige . | |
| 1,615,233 | 1/1927 | Redinger | 403/290 X |
| 1,659,268 | 2/1928 | Hooley | 285/322 |
| 1,799,762 | 4/1931 | Rathbun | 285/322 X |
| 1,802,381 | 4/1931 | Hofbauer . | |
| 2,179,930 | 11/1939 | Harrington | 285/243 |
| 2,383,692 | 8/1945 | Smith | 285/322 |
| 2,406,346 | 8/1946 | Buchanan . | |
| 3,176,359 | 4/1965 | Ward | 411/435 |
| 3,659,880 | 5/1972 | Goldsobel | 285/243 X |
| 3,667,720 | 6/1972 | Williams . | |
| 3,753,455 | 8/1973 | Butler . | |
| 3,776,579 | 12/1973 | Gale . | |
| 3,843,169 | 10/1974 | Wise | 285/322 X |
| 4,014,622 | 3/1977 | Lotz . | |
| 4,095,914 | 6/1978 | Thomsen | 403/290 X |
| 4,103,941 | 8/1978 | Stoll | 285/322 X |
| 4,304,422 | 12/1981 | Schwarz . | |

FOREIGN PATENT DOCUMENTS

| | | | |
|---|---|---|---|
| 2442392 | 7/1980 | France | 285/322 |
| 14477 | 8/1957 | Japan . | |
| 14070 | 3/1958 | Japan . | |
| 10233 | 4/1965 | Japan . | |
| 33624 | 8/1977 | Japan . | |
| 87205 | 8/1936 | Sweden | 285/322 |
| 182789 | 5/1936 | Switzerland . | |
| 1047869 | 11/1966 | United Kingdom | 403/290 |

OTHER PUBLICATIONS

Design Engineering, Dec. 1981, "The Leakfree Connection".
Jaco Manufacturing Co., Jaco Vibra-Pruf Tube Fittings, 5M 12-81 LSP.
The Lenz Company, Catalog No. 127R-A, O-Ring Seal Tube Fittings, Form No. TF-127R-A 6/80 15M.

Primary Examiner—Thomas F. Callaghan
Attorney, Agent, or Firm—Wegner & Bretschneider

[57] ABSTRACT

An externally threaded split end fitting having a surface serving as a camming surface for an end-mounted nut. By advancing the nut along the split end of the fitting the camming surface reacting upon the nut causes a transmission of a reactive force through the nut onto the external threads of the split segmented end of the fitting causing in turn a radially inward bending of the jaw-like segments of the split head. The longitudinal axis of the fitting has a passageway for receiving one or more work pieces, whereby the pivoting of the segments clamp the workpiece(s) into the fitting. The fitting is unitary.

13 Claims, 13 Drawing Figures

UNITARY CLAMP ACTION FITTING

CROSS REFERENCE TO RELATED APPLICATION

This application is a continuation-in-part of application Ser. No. 339,695, filed Jan. 15, 1982.

FIELD OF THE INVENTION

This invention relates to pipe fittings and devices for joining essentially tubular or cylindrical workpieces.

BACKGROUND OF THE INVENTION

There is a variety of fittings available on the market today. One class of fittings, hydraulic or pneumatic fittings, involve deformation or flaring of the tube or workpiece on which they are applied; another class of fittings employs a wedging action by taper rings thereby sealing the workpiece but again deforming the workpiece. A nut is generally used to provide the required compressional force.

Split head clamping fasteners have been known for some time, particularly in the field of electrical connectors. Patents illustrating such fasteners include U.S. Pat. Nos. 368,149; 1,802,381; 2,406,346; and 2,440,828 for holding electrical wires.

Although these prior art type of fittings and fasteners are useful, they have several drawbacks including the use of several mating parts, deformation of the workpiece, multiple turns at high strength of the forcing nuts, and rotation of the workpiece within the fitting as it is tightened.

SUMMARY OF THE INVENTION

The invention seeks to provide a clamp action fitting with a split externally threaded, segmented end which minimizes the deficiencies of prior art fittings. The disclosed embodiments of the invention attain the clamping action by virtue of two simultaneous coactions; the first action occurs between a nut as it is being tightened on a threaded, segmented end of the fitting and against a surface transverse, or substantially perpendicular, to the longitudinal axis of the fitting, said surface being an integral part of the fitting; the second action occurs between the threads of the nut and the threads of the segmented end. Each end segment has a common thread.

The end of the fitting is segmented by a plurality of, i.e., two or more, slots. Each of the segments forms a cantilever. As the face of the nut is moved into contact with said transverse surface, the nut experiences a reactive force directed against the nut's direction of forward motion. This reactive force is transmitted from the nut forward surface to the nut threads by the body of the nut. The nut's threads then exert a force on the externally threaded end segments of the fitting which results in a bending moment for each segment. This bending moment is generated in any cantilever.

The cantilevers or segments are thus forced inward by the force exerted on the segments thereby providing the clamping action. The fitting contains an axial passageway into which a workpiece, such as a tube, may be placed. A tube or other workpiece is rigidly held in place by the clamping action of the fitting. A principal advantage of the invention is that the workpiece is not forced to rotate or move in any way as the nut is tightened. The invention works on the basis of a clamping action as opposed to a wedging or deformation action which is characteristic of much of the prior art.

Each embodiment of the invention uses a clamping action involving only integral parts of the fitting so that the fitting is unitary; however, a fitting can have one split end or two or more split ends depending on the application. For example, two pipes may be held end-to-end in the same fitting. The slots dividing the end or ends into segments may be longitudinal through the axis or not, skewed, or of a generally curved form.

The present invention includes several advantages over the fittings and fasteners of the prior art. These advantages include the clamping action, which is achieved by a cantilever bending action rather than by wedging action using high force; the containment of the camming surface and nut as integral parts of the fitting; the non-movement of the workpiece or workpieces within the fitting as the clamping action takes place; the unitary construction of the fitting, eliminating multiple mating parts; the lack of a need to prepare the workpiece specially (by swaging, flaring, machining etc.) for use in the fitting; the elimination of workpiece rotation; the use of only a fraction of a turn, in many cases ony about 18 degrees, or one-twentieth of a turn, of the fitting nut for full clamping action; the reusability of the fitting; and the adaptability of the fitting to many materials. The invention is not limited to fitting materials and gives good results in a wide variety of metals as well as in plastics and other flexible materials.

The body is not limited to the embodiments disclosed in this document. In particular, although the fitting may be used to join pieces of tubing or pipe in end-to-end relationship to form a tight, fluid-transmitting joint, the fitting may also be used to join tubular or cylindrical members structurally. In this latter use the fitting is particularly advantageous because it requires few tools and little effort to fasten the members together. Provided that the operative portions of the fitting function in accordance with this disclosure, the fitting may take any exterior shape as required by the application.

DETAILED DESCRIPTION OF THE INVENTION

Figure 1B:
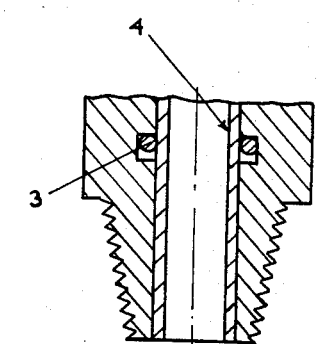
FIG. 1B shows the fitting of FIG. 1A with an O-ring seal therein.
Figure 3:
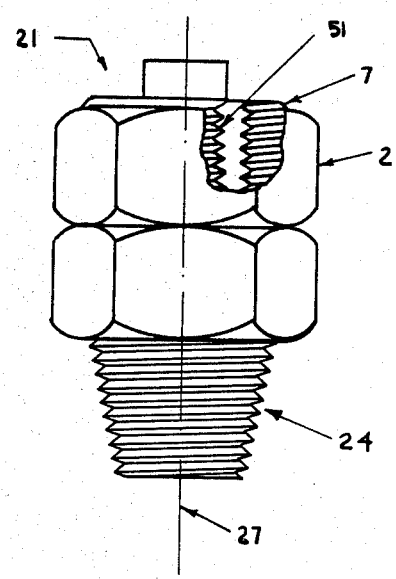
FIG. 3 is a side view of the fitting showing a partial view of one longitudinal slot.
Figure 1A:
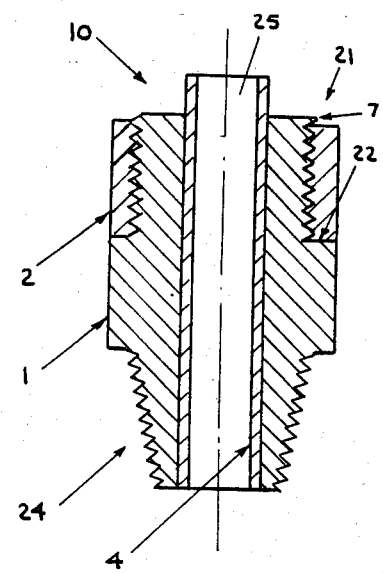
FIG. 1A is an axial sectional view of a fitting according to this invention, not including an O-ring seal.

The complete fitting embodiment 10 shown in FIGS. 1A, 1B, 2, 3 and 4 is depicted in the engaged position with a nut 2 and a main body 1, which is subdivided into a split segmented end 21, a transverse surface 22, an external indentation 23 serving to separate segmented end 21 from the transverse surface 22; a remaining section 24 and a central axial passageway 25 running the entire length of the main body 1. FIG. 1A shows the complete fitting embodiment without the O-ring seal 3 depicted in FIG. 1B; although many applications of this fitting will indicate that use of O-ring seal 3 is recommended, the seal is not absolutely required to form a tight fit between the main body and the workpiece.

Figure 2:
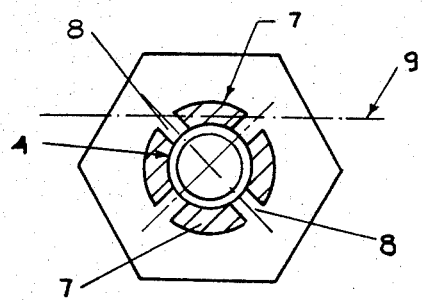
FIG. 2 depicts a transverse cross section through the nut of the fitting of FIG. 1A.

The split segmented end 21 is split into a plurality of segments by a plurality of slots 8, each segment having a common external thread 51, and each segment forming a cantilever. Four such slots 8 and four such segments 7 are shown in the embodiment illustrated in FIG. 2. The split segmented end 21 of the main body 1 shown in FIG. 2 is divided into four equal segments by four longitudinal slots which are equidistantly spaced; however, more or fewer slots could be employed producing more or fewer segments respectively; a minimum of two slots is required. The slots need not be equidistantly spaced, although such spacing is preferred.

Figure 4:
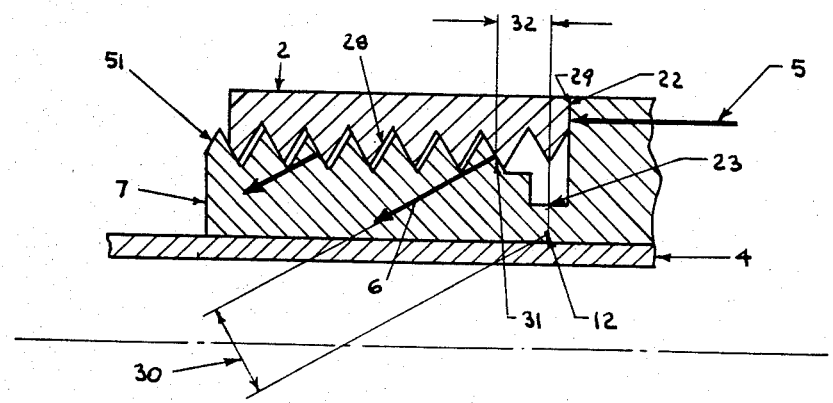
FIG. 4 is a enlarged view of the split segmented end of the embodiment of FIGS. 1, 2 and 3.

FIG. 4 shows a detailed sectional view of a single segment 7 from segmented end 21, a sectional view of external indentation 23, a sectional view of a portion of body 1 including transverse surface 22 and a sectional view of nut 2. The surface 22 joining the indentation 23 to the rest of the body is a camming surface or reactive force surface for nut 2. Surface 22 is generally or substantially perpendicular to the axis 27 of axial passageway 25, but may deviate from the perpendicular provided that the reactive force produced by tightening the fitting is sufficient to hold the workpieces. Shown also in FIG. 4 in the sectional view of segment 7 are the external threads 51 of segment 7. Each end segment 7 is externally threaded. Shown also in FIG. 4 are the threads 28 of nut 2 and a workpiece, in this case a tube 4. Each of the end segments forms a cantilever, with threaded segment 7 being the projected member of the cantilever and the member being supported at the indentation 23. The neutral axis 9 of the cross section through indentation 23 for one end segment 7 is shown in FIG. 2. The neutral axis reduces to a point 12 in FIG. 4. A bending moment is generated in any cantilever.

In operation, fitting 10 clamps and holds a workpiece such as tube 4 in FIGS. 1A or 1B and 4 in place. The clamping action begins with the tightening of nut 2. As nut 2 is tightened, its leading edge 29 approaches surface 22. When surface 29 contacts surface 22, a reactive force 5 is produced; as nut 2 continues to be tightened, surface 22 acts as a camming surface. As is shown in FIG. 4, force 5 is transmitted via the body of nut 2 to the threads 51 of cantilever segment 7 resulting in the production of a plurality of forces of which only one force, 6, is numbered. Forces 6 drive or move the segment or cantilever 7 radially inward, thus clamping the workpiece or tube 4 in place. This action is simultaneously produced in all end segments 7, thus clamping the workpiece 4 rigidly in place.

A key factor in clamping action is the magnitude of the distance 30 shown in FIG. 4. The distance, 30, is the distance from the point of application of the strongest force to the neutral axis projection, point 12. Force 6 is not uniform along the threads 13 and is strongest at thread surface 31. Thus the distances 30 and 32 in FIG. 4, which are moment arms of the bending force, are of critical importance to the force level 6 required for the onset and level or strength of the clamping action.

The forces 6 prevent any axial motion of the tube 4, when elevated pressure exists inside the tube and fitting. The "O" ring 3, shown in FIG. 1B, prevents the escape of any fluid flowing in tube 4 and fitting 10 if the fluid should infiltrate between the end of tube 4 and body 1. In many cases, however, the fit is sufficiently tight that fluid is contained even where no O-ring is used, as in FIG. 1A.

Figure 5:
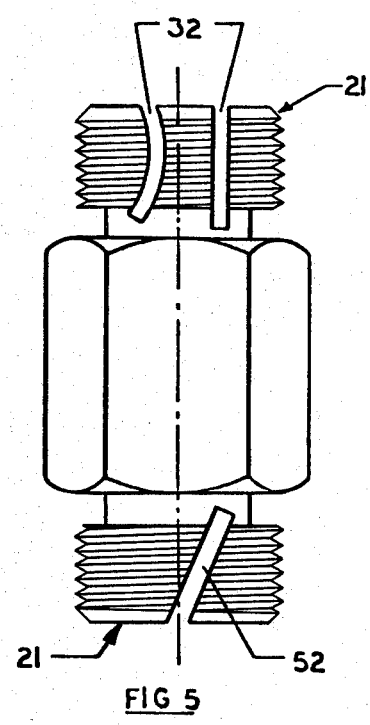
FIG. 5 shows a side view of a fitting with ends segmented by skewed, curved, or longitudinal slots.
Figure 8:
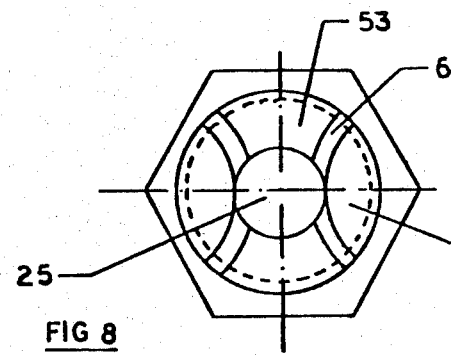
FIG. 8 shows an end view of a fitting employing a cylindrical slot.

In FIG. 2 the split segmented end of fitting 10 is shown to have four longitudinal slots in the preferred embodiment of FIGS. 1A, 1B, 2, 3 and 4. The slots shown in FIGS. 1A and 1B extend axially to point 12 of FIG. 4. In FIG. 5 another fitting embodiment is shown wherein the split segmented end 21 is segmented by various types of slots 32. These slots are not radial in that they do not transect the central axis 27 of the axial passageway 25 as do slots 8. Slot 52, shown in FIG. 5, is a skewed slot which is neither longitudinal nor radial. Yet another type of slot is shown in FIG. 8. Slots 62 are of cylindrical shape, resulting in segments 53 of different shape. Clearly many different slot designs are possible, any one of which can work with the bending clamping action of this invention.

Figure 6:
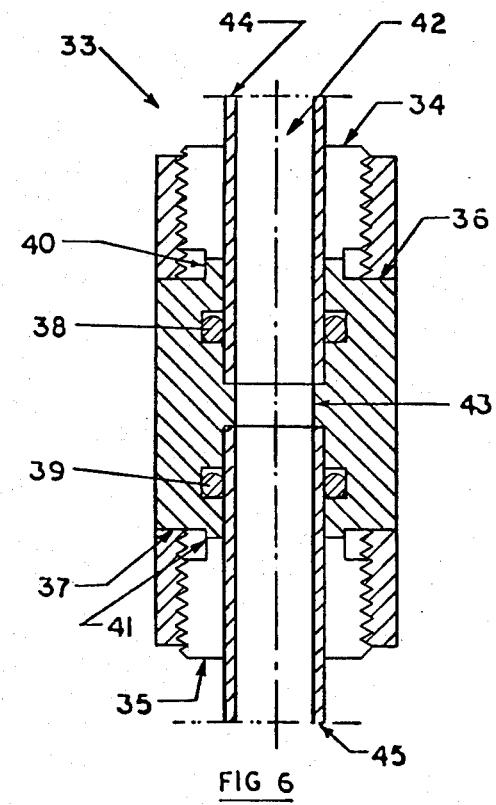
FIG. 6 shows a cross-sectional view of another embodiment of the fitting of this invention.

Looking next at FIG. 6 there is illustrated a fitting embodiment 33, with two slit segmented ends 34 and 35; two camming or force reactive surfaces 36 and 37, two O-rings 38 and 39; two indentations 40 and 41; and an axial passageway 42, running from end to end of the fitting 33. Also shown in FIG. 6 is a workpiece connector 43, which allows two workpieces 44 and 45, or tubes of the same or different sizes to be joined. Tubes 44 and 45 are clamped into place by the cantilever bending action of fitting 33 as nuts on ends 34 and 35 are tightened against camming surfaces 36 and 37 respectively.

Figure 7:
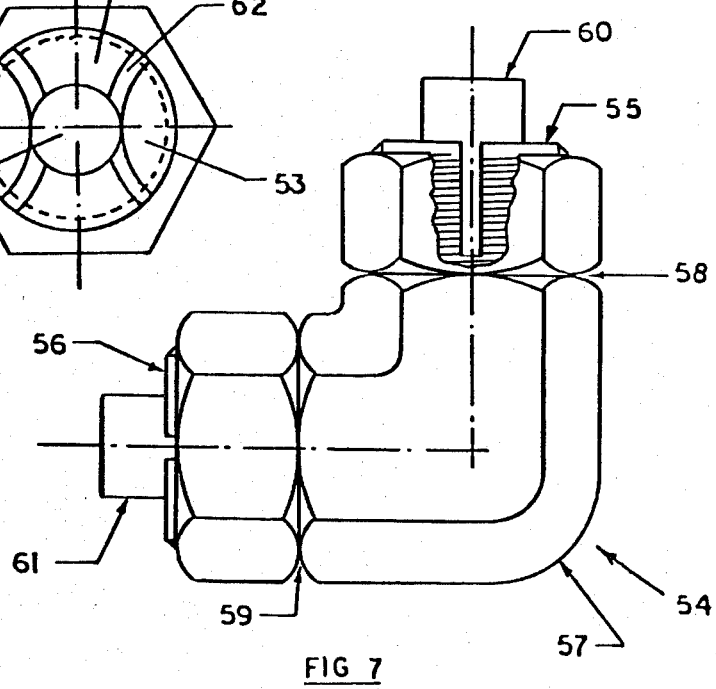
FIG. 7 shows an outer side view of yet another embodiment of the fitting of this invention.

Yet another fitting embodiment 5, is shown in FIG. 7. Fitting embodiment 54 has two segmented ends 55 and 56 and a main body 57 which is bent into "elbow" form. Two camming or force reactive surfaces, 58 and 59, are used. Fitting embodiment 54 allows the joining of two workpieces 60 and 61 at an angle.

Clearly a wide variety of main body shapes may be used with the fitting of the invention. Other possible body shapes include, but are not limited to, reducer unions, female connectors, male and female elbows, tube tees, male and female side tees, male and female run tees, tube crosses, bulkhead unions, bulkhead elbows, and bulkhead tees.

Figure 9:
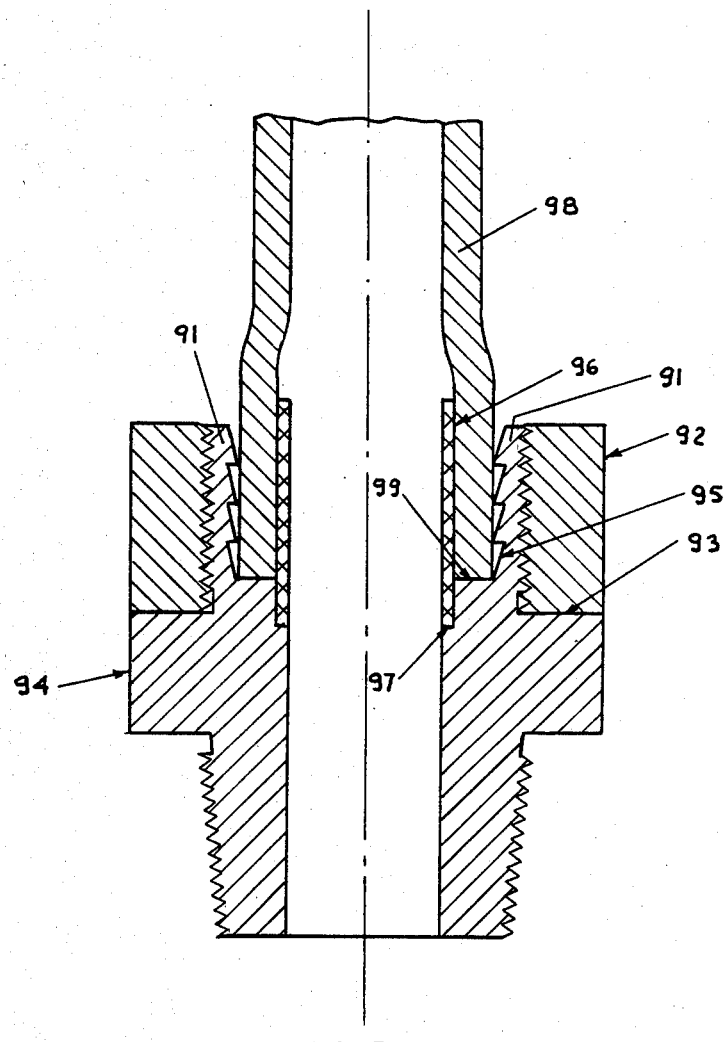
FIG. 9 is a longitudinal cross sectional view of an embodiment of the fitting for use with soft or flexible tubing, pipe or hose.

FIGS. 9, 10, 11A and 11B show more specialized embodiments of fittings of this invention. FIG. 9 shows the form of a fitting which may advantageously be used with soft or flexible tubing or pipe, such as rubber or plastic hose, soft-wall tubing, braided hose, metal-braided hose and the like. The fitting of FIG. 9 has components which are analogous to the components of other fittings according to this invention: jaw-like segments 91, each of which forms a cantilever; nut 92; transverse camming surface 93; and the main body 94. The inner surface of each jaw-like segment 91 can be smooth or serrated (as depicted) to provide additional gripping or holding of the workpiece 98. In addition, a rigid metal or other stiff ring 96 is pressed into an indentation or shoulder 97 or formed as an integral part of the main body to provide a surface against which the jaws 91 may press and hold flexible workpiece 98. To assemble the fitting of FIG. 9, all that is required is to push the hose or other workpiece 98 over the ring 96 and to slide the two into the shoulder 99; this operation is fairly easy, since the segments 91 are not as yet tightened. Turning the fitting nut 92 to tighten clamps the workpiece in place. This fitting has the particular advantage of requiring no O-ring seal to assure fluid tightness, since an adequate seal is made by the contact between the inner surface of the tube 98 and the outer surface of ring 96, which may also be serrated for additional sealing (not depicted).

Figure 10:
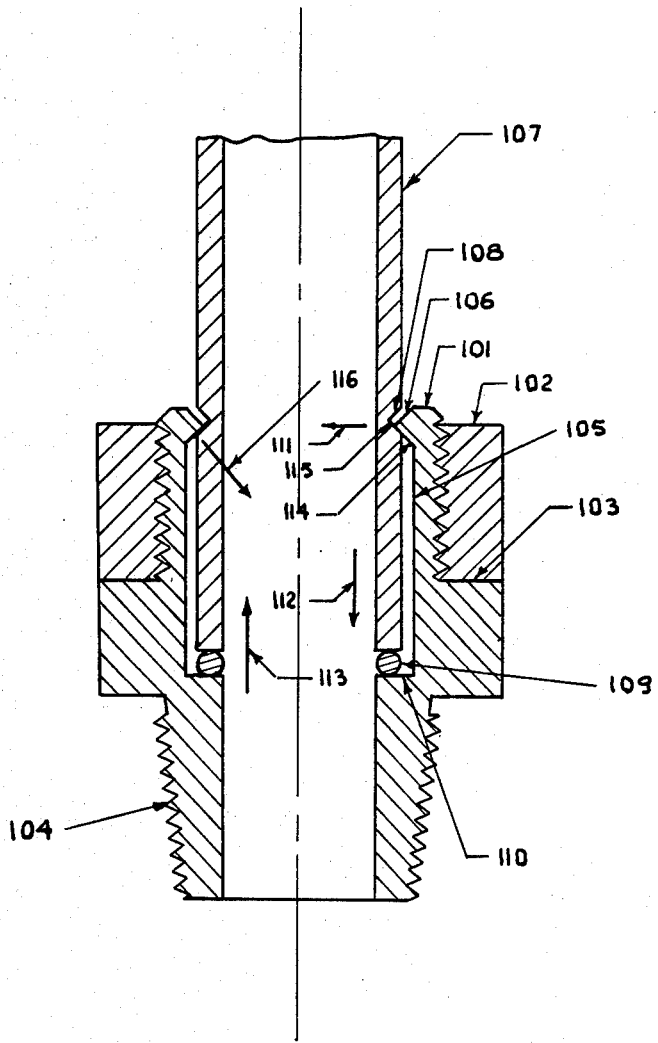
FIG. 10 shows a longitudinal cross section of yet another fitting of this invention wherein sealing is accomplished through pressure on the sealing member rather than by frictional fit.

FIG. 10 depicts an embodiment of the fitting wherein the fluid-seal is accomplished through pressure upon an O-ring or soft-metal ring, or other deformable material ring rather than by a frictional fit of an O-ring about the tube or workpiece. The fitting is comprised of the standard fitting component of this invention: jaw-like segments 101, each of which forms a cantilever, a nut 102, a camming surface 103, and the main body of the fitting 104. The internal surface 105 of each cantilever or end-segment contains a wedge-shaped protuberance 106 or "tooth" extending inward from the end of the internal surface 105. The rigid workpiece or tube, 107, contains a wedge-shaped indentation, 108, corresponding to the protuberances 106. An O-ring 109, (or other sealing material, like a soft-metal ring or plastic ring, etc.) rests upon a shoulder 110, within the main body 104 of the fitting.

In the operation of the fitting of FIG. 10, as nut 102 is tightened segments 101 move inward in the direction indicated by arrow 111. Workpiece 107 is then simultaneously clamped by a radial force (in the direction of arrow 111) exerted by segments 101 and moved forward axially or longitudinally in the direction indicated by arrow 112; subsequently exerting a pressure or compressional force upon O-ring 109, thereby forming a fluidtight seal. If the workpiece is held in a rigid position by some structure external of the fitting, then the fitting will move forward in the direction indicated by arrow 113, thereby compressing the O-ring. In any case, it is the motion of the workpiece relative to the fitting which causes the seal. The axial or longitudinal force is produced by the action of tapered surface 114, which is part of fitting segment protuberance upon tapered surface 115 which is part of the tube or workpiece 107. The net force exerted by surface 114 upon surface 115 is in the direction indicated by arrow 116. This force is seen to have both axial and radial components thereby providing both the required "clamping" action and longitudinal "compressional" action.

The fitting of FIG. 10 exhibits several significant advantages, among which are high axial resistance to disengagement by pulling on the fitting and the provision of a seal capable of withstanding high pressures before fluid leakage begins at all. In view of the mode of sealing, furthermore, it is possible to accommodate tubes or workpieces that are significantly out of round by making the O-ring or other seal 109 and the shoulder 110 large enough to accept the eccentricity. The combined clamping and compressing of this fitting will hold such an out of round piece.

Figure 11B:
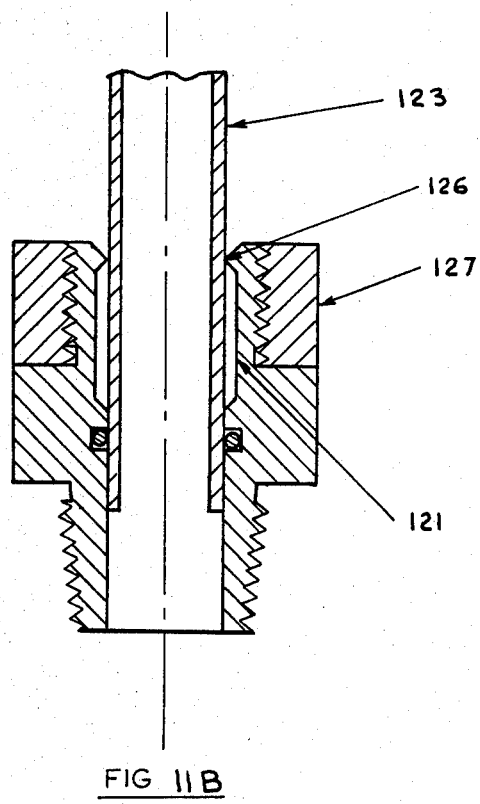
FIG. 11B shows a fitting similar to that shown in FIG. 11A, without the indentations in the workpiece.
Figure 11A:
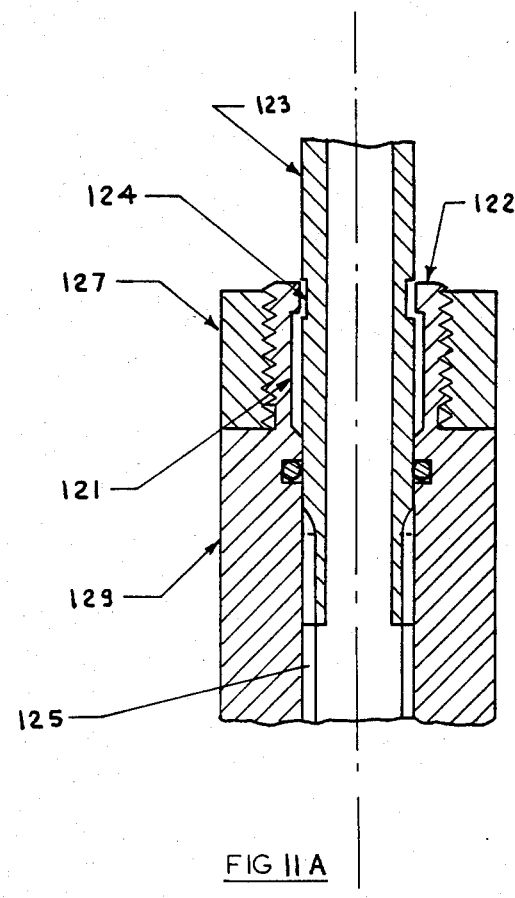
FIG. 11A depicts a longitudinal cross sectional view of an embodiment of this invention wherein the jaw-like segments are provided with protuberances to engage in corresponding indentations in the workpiece.

FIGS. 11A and 11B show yet another configuration of the fitting using protuberances on the inner surfaces of the jaw-like segments to increase the ability of the fitting to withstand axial loads and torques. The internal surface 121 of each cantilever segment has a protuberance 122, which corresponds to an indentation 124 in the workpiece 123, as shown in FIG. 11A. Also shown in FIG. 11A is an optional spline 125, not shown in FIG. 11B, forming a tight fit between the workpiece 123 and the body 129 of the fitting. FIG. 11B shows a similar fitting in which protuberance 126 on surface 121 is tightened against the workpiece by means of the nut 127. This fitting is not quite as tight as the fitting of FIG. 11A.

In the fitting of FIG. 11A in particular, the mating of protuberance 122 and indentation 124 under the forces of the fitting provides high resistance to having the tube or workpiece pulled out of the fitting by high pressure in the tube. This metal-to-metal joining gives the high pressure capacity. The spline 125 functions to provide resistance to separation or loosening of the workpiece in the fitting under high rotational torque, as can be experienced in oil drilling operations.

I claim:

1. A cantilever clamp action fitting for holding a tubular or cylindrical member having a longitudinal axis at least partially therethrough, comprising a circumferentially continuous main body and a nut having a parallel-sided, internally threaded bore, said main body comprising:

an axial passageway extending into said body along the longitudinal axis, an externally threaded segmented substantially straight end which can mate with the nut and which has slots dividing the end into a plurality of segments, and a transverse surface providing areas disposed about the longitudinal axis, said transverse surface being substantially perpendicular to the longitudinal axis and forming a camming a reacting force surface for the nut;

said threads on said nut and said segments each having tapered side walls, the axial passageway, segmented end and transverse surface being arranged such that when a member is inserted into the passageway and the nut is tightened against the transverse surface, a reactive compressive force is transmitted through the nut, via the internal nut threads reacting on the externally segment threads, to the segments of the segmented end, and both radial and longitudinal components of the reactive force contribute to the bending of the segments and cause each segment to bend inward toward the longitudinal axis, thereby clamping the member tightly.

2. A fitting according to claim 1, wherein the main body further comprises an O-ring seal disposed about the axial passageway.

3. A fitting according to claim 1 or 2, wherein the slots in the threaded segmented end are not parallel to the longitudinal axis.

4. A fitting according to claim 1 or 2, wherein the number of segments in the segmented end is 3 or 4.

5. A fitting according to claim 1 or 2, wherein the main body has a plurality of threaded segmented ends provided thereon.

6. A fitting according to claim 1 or 2, wherein the main body further comprises a shoulder against which a stiff ring is seated, such that when a member is inserted into the main body, the member is radially surrounded by said ring and the segments of the threaded segmented end.

7. A fitting according to claim 1 or 2, wherein a ring is formed integrally with the main body in the passageway, such that when a number is inserted into the fitting, the member is radially surrounded by the ring and the segments of the threaded segmented end.

8. A fitting according to claim 1 or 2, wherein the segments of the threaded segmented end have protuberances thereon for engaging with the member.

9. A fitting according to claim 10, wherein the member has an indentation therein corresponding to the protuberances in the segments.

10. A fitting according to claim 6, wherein the inner surfaces of the segments are serrated.

11. A fitting according to claim 7, wherein the inner surfaces of the segments are serrated.

12. A fitting according to claim 8, wherein the main body has a shoulder against which a ring of sealing material is seated, such that an end of the member when inserted into the fitting seats against the ring.

13. A fitting according to claim 9, wherein the main body has a shoulder against which a ring of sealing material is seated, such that an end of the member when inserted into the fitting seats against the ring.

* * * * *